W. W. Beach.
Neck-Tie.
Nº 43,620. Patented July 19, 1864.
Sheet 1. 2 Sheets.
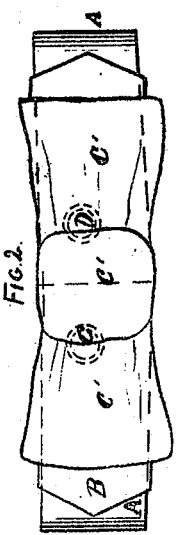
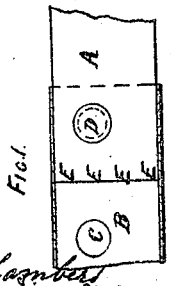
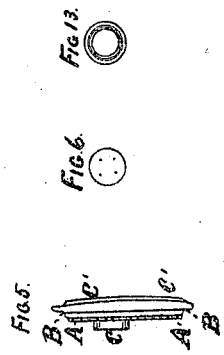
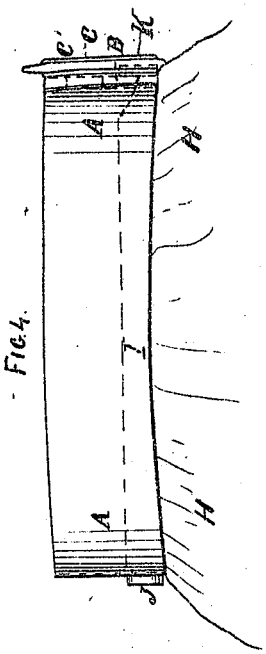
Witnesses
Monmouth H Chambers
Jas. Wightman
Inventor
Wm. W. Beach W. W. Beach.
Neck-Tie.
No. 43,620. Patented Jul. 19, 1864.
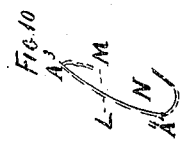
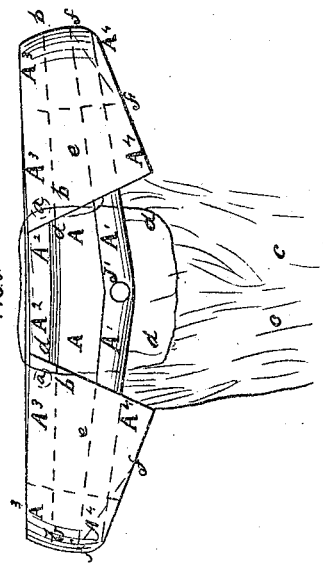
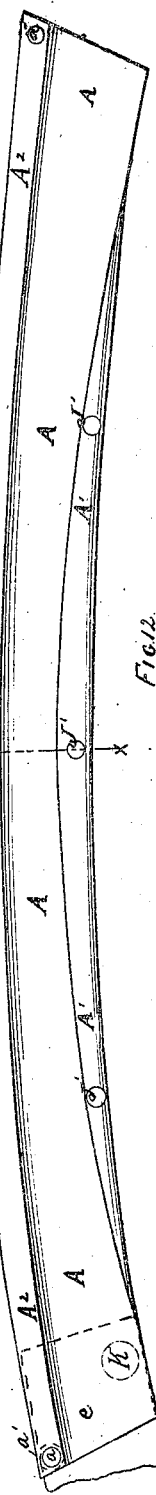
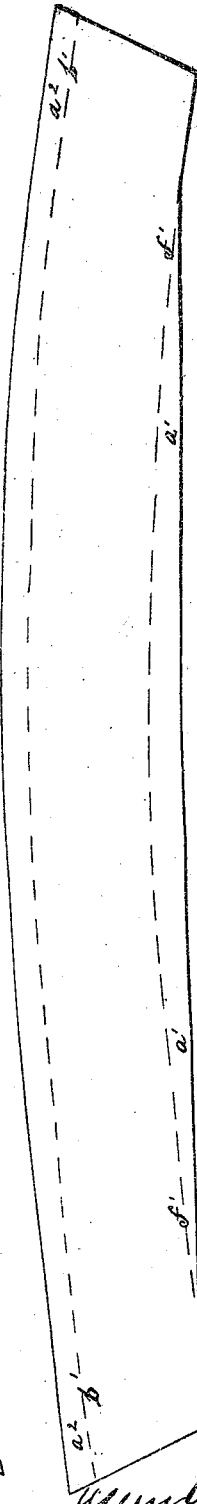
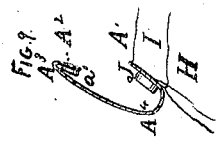
Witnesses
Monmouth H. Chambers
Jas. S. Wightman
Inventor
Wm. W. Beach

UNITED STATES PATENT OFFICE.

WILLIAM W. BEACH, OF NEW YORK, N. Y., ASSIGNOR TO HIMSELF AND FREDERICK CHAMBERLAIN, OF SAME PLACE.

IMPROVEMENT IN VULCANIZED-RUBBER CRAVATS.

Specification forming part of Letters Patent No. 43,620, dated July 19, 1864.

*To all whom it may concern:*

Be it known that I, WILLIAM W. BEACH, of the city, county, and State of New York, have invented a new and useful Improvement in Cravats; and the following is a full, clear, and exact description of the same, reference being had to the accompanying drawings, making a part of this specification, in which—

Figure 1 shows the two ends of a hard rubber cravat, with eyelet-holes for fastening. Fig. 2 represents the cravat with a bow in front. Fig. 3 shows a section of a cravat broken off, with an ornamental device. Figs. 4, 5, &c., show different views of the hard-rubber cravat and the buttons for fastening the same and the bows or other devices to the cravat.

My invention consists in the application and use of hard india-rubber, or its equivalent, for cravats or neck-stocks, and the mode of buttoning or securing the same together at the ends, and at the same time attaching bows or other appendages for ornament or use.

To enable others skilled in the art to make and use my improvement, I will describe it more fully, referring to the drawings and to the letters marked thereon.

I make my cravat of hard vulcanized india-rubber or of any equivalent substance that is anti corrosive or non-absorbing in narrow bands, as A A in the several figures, or they may be in any desired form or size. The width and shape may be varied to suit the various styles or tastes of individuals. They may be made plain or they may be embossed or wrought in figures of various devices or perforated in figures or holes of any shape or size, for the purpose of lightening or ventilation, or ventilation by corrugation. In each end of the band A A, which encircles the neck, I make round holes or eyelets C D, for the purpose of attaching knots or bows B C', or any other ornament or device. These bows may be made of silk or any other suitable fabric and of any desirable color.

For the purpose of easily attaching the knots, bows, or other appendages to the cravat I use soft vulcanized rubber buttons or other equivalent elastic substance that can be contracted, so as to be pressed into or through the eyelets C D, thereby holding the ends of the cravat A A together and in its place, and to prevent the band or cravat from changing its position or working round on the neck I make similar eyelets in its center or on the sides, into which the soft rubber or elastic buttons may be forced, which will hold it in place. A paper collar, *e e*, may be temporarily attached or cemented to the inside of the rubber band or cravat A A and turned over, as seen in Figs. 8, 11, and 12, so that the collar and cravat, being attached together, will be put on at one and the same time and present the most genteel appearance.

The advantages to be derived by my invention are that hard rubber, gutta-percha, and other substances or prepared gums are anti-corrosive and will not oxidize or rust like metallic substances when used for articles of wearing apparel. They are also non-absorbing, and consequently perspiration will not affect their appearance or durability, and they can be easily cleaned of dust or anything that may adhere to them by the use of a sponge and water, and thus kept in a perfect condition for service as easily and with as little trouble to the possessor as to wash the hands or face.

Having thus fully described my invention, what I claim as new, and desire to secure by Letters Patent, is—

1. The application of hard vulcanized india rubber for neckties and cravats.

2. Embossing and ornamenting neckties and cravats when made of hard vulcanized india rubber and of ventilating the ties and cravats by perforation or corrugation.

WM. W. BEACH.

Witnesses:
  M. H. CHAMBERS,
  W. S. TISDALE.